United States Patent [19]

Schneider

[11] Patent Number: 4,536,708
[45] Date of Patent: Aug. 20, 1985

[54] APPARATUS FOR OBTAINING AN INFORMATION ON THE MOTION OF A MOVING ELEMENT, PREFERABLY FOR ROTATIONAL SPEED OF A ROTATING ELEMENT IN AN AUTOMOBILE

[75] Inventor: Arthur Schneider, Braunschweig, Fed. Rep. of Germany

[73] Assignee: Volkswagenwerk Aktiengesellschaft, Wolfsburg, Fed. Rep. of Germany

[21] Appl. No.: 640,203

[22] Filed: Aug. 10, 1984

Related U.S. Application Data

[63] Continuation of Ser. No. 380,247, May 20, 1982, abandoned.

[30] Foreign Application Priority Data

Jul. 2, 1981 [DE] Fed. Rep. of Germany ....... 3126023

[51] Int. Cl.³ ................................................ G01P 3/48
[52] U.S. Cl. .................................... 324/174; 250/227; 324/402
[58] Field of Search ....................... 324/174, 175, 402; 246/249; 250/227

[56] References Cited

U.S. PATENT DOCUMENTS

| | | | |
|---|---|---|---|
| 3,134,918 | 5/1964 | Eichenberger et al. | 324/174 X |
| 4,096,383 | 6/1978 | Mancini et al. | 250/227 X |
| 4,117,460 | 9/1978 | Walworth et al. | 250/227 X |
| 4,204,115 | 5/1980 | Boldridge, Jr. | 250/227 |
| 4,239,963 | 12/1980 | August et al. | 250/227 X |
| 4,310,754 | 1/1982 | Check, Jr. | 250/227 X |
| 4,417,140 | 11/1983 | Adolfsson et al. | 250/227 |

Primary Examiner—Stanley T. Krawczewicz
Attorney, Agent, or Firm—Brumbaugh, Graves, Donohue & Raymond

[57] ABSTRACT

Apparatus for determining rotational speed includes a sensor for generating electrical pulse signals representative of rpm in a conventional manner. The electrical pulses are converted to light pulses at the sensor and transmitted to an evaluation circuit, where they are reconverted into electrical pulses that are processed by the evaluation circuit. Interference signals that a rise during the transmission of electrical pulses to the evaluation circuit are thereby eliminated.

1 Claim, 1 Drawing Figure

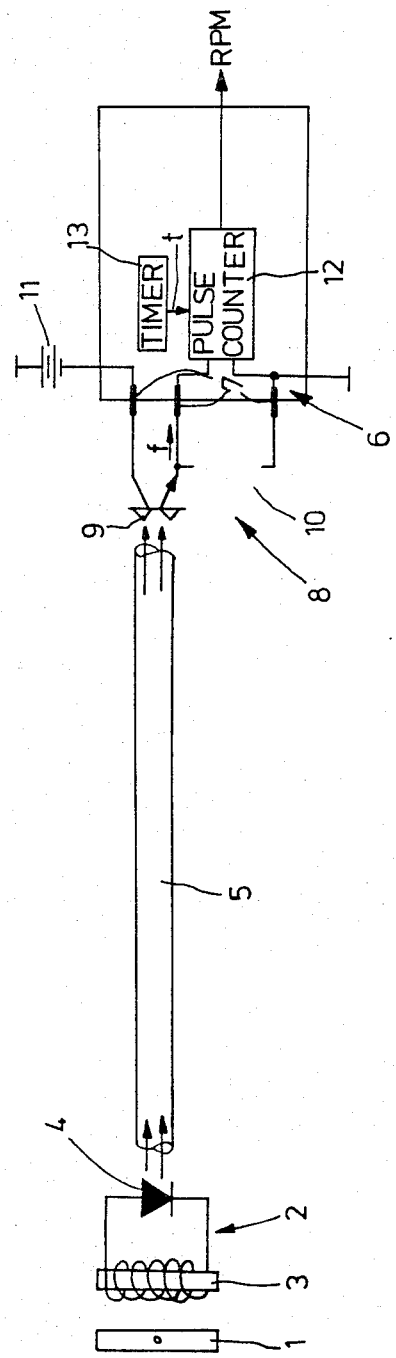

4,536,708

APPARATUS FOR OBTAINING AN INFORMATION ON THE MOTION OF A MOVING ELEMENT, PREFERABLY FOR ROTATIONAL SPEED OF A ROTATING ELEMENT IN AN AUTOMOBILE

This application is a continuation of application Ser. No. 380,247 filed May 20, 1982, now abandoned.

BACKGROUND OF THE INVENTION

This invention relates to an apparatus for obtaining an information on the motion of a moving element, preferably for determining the speed of a rotating element, for example engine rpm in an automobile.

Arrangements of the kind referred to above are well known. In a conventional arrangement for measuring engine rpm, a sensor detects magnetic irregularities, e.g., teeth or clearances, in a rotating component torsion-resistantly connected with the internal combustion engine. The changing magnetic field induces electrical pulses in the sensor which are transmitted by an electrical transmission line to an evaluation circuit. The evaluation circuit, which is conventional and includes commercially available components, determines the rotational speed of the rotating component from the number of pulses per time unit, or from the time interval between individual pulses, such time interval being inversely proportional to the rotational speed. In one commercially available sensor, a Wiegand sensor, which does not need an electric power supply, as a battery, electrical pulses are produced that have a width independent of the rotational speed of the rotating component.

The measurement of speed, which is derived from the speed-dependent pulses, can be affected by the presence of outside electrical signals or noise which is picked up during transmission of the electrical pulse signals from the moving component to the evaluation circuit. It has been found that it is difficult to suppress, at a reasonable cost, such interfering signals.

SUMMARY OF THE INVENTION

The present invention is an arrangement for measuring for instance the speed of a component which eliminates interfering signals, which can employ a conventional, commercially available pulse generating sensor and conventional evaluation circuit components, and which is simple in construction.

More particularly, the present invention is an apparatus for the purpose referred to including a sensor for generating electrical pulses, a light emitting diode for converting the electrical pulses, a fiber-optical light guide for transmitting the light pulses, means for reconverting the light pulses to electrical pulses at the receiving end of the light guide, and means for evaluating these electrical pulses to determine rotational speed.

An advantageous feature of the invention resides in the fact that the pulse transmission line uses welltested, reliable, low-cost components, i.e., a fiber-optical light guide and pulse converters which eliminate interfering signals.

BRIEF DESCRIPTION OF THE DRAWING

FIG. 1 is a diagrammatic illustration of an apparatus for measuring the rotational speed of a rotating component.

DETAILED DESCRIPTION OF THE PREFERRED EMBODIMENT

A device for generating electrical pulses, as a function of rpm, is shown in the FIGURE. A permanent magnet 1 is connected torsion-resistantly with the crankshaft of an internal combustion engine, and the rotations of the permanent magnet 1 are detected by sensor 2 as electrical pulses in the coil of a solenoid 3 the frequency of the pulses being dependent on the rpm of permanent magnet 1. A Wiegand sensor may be used as the sensor arrangement 2 for the purpose of generating the electrical pulses. Electric pulses, produced in solenoid 3, are converted into light pulses by light-emitting diode 4. The ight pulses are transmitted by a fiber-optical light guide 5 to an evaluation circuit 6. Due to the inherent properties of fiber-optical light guides, the light guide may be bent to extend along existing curved supports or through available hollow spaces.

The evaluation circuit 6 preferably includes a microcomputer for performing counting, timing, and dividing operations. A light pulse-to-electrical pulse converter 8 is connected to the evaluation circuit 6 by the plug-in connections 7. The converter 8 includes a phototransistor 9 and a resistor 10. By impressing a voltage from battery 11 on the collector of phototransistor 9, light pulses incident on phototransistor 9 induce corresponding electrical pulses on the emitter side of phototransistor 9, thereby reconverting the light pulses into electrical pulses. The reconverted electrical pulses are thereafter provided to, and processed by, the evaluation circuit 6 in a conventional manner to determine rotational speed. More particularly, electrical pulses from the phototransistor having a frequency f dependent on the rpm of permanent magnet 1 are fed to a conventional counter circuit 12, which counts the number of pulses over a counting period t preset by timer 13. So the pulse counter 12 counts the number of pulses having the rpm-dependent frequency f and falling within the fixed time interval t. The number of pulses per revolution of magnet 1 being known, the number of pulses counted by counter 12 which may be stored or converted to an analogue signal directly represents said rpm.

The foregoing represents a preferred embodiment of the invention. Variations and modifications will be apparent to persons skilled in the art without departing from the inventive concepts discloses herein. For example, in place of counting the number of pulses per time unit, the evaluation circuit can also measure the time intervals between impulses resulting from the light impulses, in that the time interval between pulses is inversely proportional to rpm. The time intervals can be measured using a saw-tooth generator being started by one impulse and stopped by the following impulse, the saw-tooth voltage at the moment of stoppage being the measured value (i.e. a sample and hold technique). All such modifications and variations are intended to be within the scope of the invention as defined in the following claims.

I claim:

1. Apparatus for determining accurately the speed of a moving element at a remote location over a broad range of speeds without interference from electrical noise signals comprising permanent magnet means rigidly attached to the element, Wiegand sensor means positioned adjacent to the moving element and responsive to passage of the permanent magnet means during motion thereof in the absence of an electrical energy source to generate an electrical pulse having a width which is independent of the speed of the element so as to provide a series of signals having a frequency directly proportional to the speed of the element;

light-emitting diode means for converting individual electrical pulse signals produced by the sensor means into corresponding light pulse signals;

a fiber-optical light guide arranged to transmit said light pulse signals through a region subjected to electrical noise signals to a remote detector means;

detector means responsive to individual light pulse signals from said fiber-optical light guide to provide corresponding individual electrical pulse signals; and signal evaluation means for determining the frequency at which the individual electrical pulse signals are produced by the detector means and thereby determining the speed of the element.

* * * * *